US010562002B2

(12) United States Patent
Maas et al.

(10) Patent No.: US 10,562,002 B2
(45) Date of Patent: Feb. 18, 2020

(54) EASY CLEAN CATALYST FILTER BASKET

(71) Applicant: SHELL OIL COMPANY, Houston, TX (US)

(72) Inventors: Edwin Maas, Katy, TX (US); Ruud Kneppers, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 164 days.

(21) Appl. No.: 15/347,035

(22) Filed: Nov. 9, 2016

(65) Prior Publication Data

US 2017/0128901 A1   May 11, 2017

Related U.S. Application Data

(60) Provisional application No. 62/252,676, filed on Nov. 9, 2015.

(51) Int. Cl.
| | |
|---|---|
| *B01J 8/00* | (2006.01) |
| *B01D 29/23* | (2006.01) |
| *B01D 29/96* | (2006.01) |
| *B01D 35/02* | (2006.01) |
| *B01J 8/02* | (2006.01) |

(52) U.S. Cl.
CPC ............ *B01J 8/008* (2013.01); *B01D 29/23* (2013.01); *B01D 29/96* (2013.01); *B01D 35/02* (2013.01); *B01D 2201/4053* (2013.01); *B01D 2201/4092* (2013.01); *B01J 2208/00884* (2013.01)

(58) Field of Classification Search
None
See application file for complete search history.

(56) References Cited

U.S. PATENT DOCUMENTS

| | | | | |
|---|---|---|---|---|
| 3,016,984 | A * | 1/1962 | Getzin | B01D 46/06 210/232 |
| 2010/0089813 | A1* | 4/2010 | Tellier | B01D 17/045 210/236 |
| 2014/0290492 | A1* | 10/2014 | Lomax | F15D 1/02 96/130 |

OTHER PUBLICATIONS https://en.wikipedia.org/wiki/Split_pin.*

* cited by examiner

*Primary Examiner* — Benjamin M Kurtz

(57) ABSTRACT

A catalyst filter basket for containing catalyst material within a catalytic chemical reactor. The catalyst filter basket includes a central frame having a base ring and a generally cylindrical inner screen portion which extends upwardly from the base ring. A generally cylindrical outer screen assembly is releasably secured to the central frame by a quick release mechanism.

12 Claims, 9 Drawing Sheets

EASY CLEAN CATALYST FILTER BASKET

This application claims the benefit of U.S. Provisional Patent Application Ser. No. 62/252,676 filed Nov. 9, 2015, is incorporated herein by reference.

FIELD OF THE INVENTION

The invention relates generally to the design of filter baskets used to retain solid catalytic materials in a catalytic reactor.

BACKGROUND OF THE INVENTION

Catalytic reactors are used in chemical processing. A chemical feed is flowed over or through a solid, typically granular, catalyst material to induce or accelerate desired chemical reactions.

SUMMARY OF THE INVENTION

The invention provides a catalyst filter basket for use in a catalytic reactor. The described catalytic filter basket is designed to retain an amount of solid catalyst and be seated upon a support tray in a reactor. Described catalyst filter baskets have a quickly removable outer screen assembly which allows used catalyst material to be easily removed and replaced.

An exemplary catalyst filter basket is described which includes a central frame having a base ring and a generally cylindrical inner screen which extends axially from the base ring. A generally cylindrical outer screen radially surrounds the inner screen. The outer screen is formed of multiple separate screen portions which are assembled to form a complete cylindrical screen. At least one of the separate screen portions is secured in an easily releasable manner to another of the screen portions and removable from the filter basket upon release. Quick release mechanisms in the forms of a draw bolt and a split key connector are described.

According to preferred embodiments, a locking groove arrangement axially fixes the outer screen assembly upon the central frame. A ridge on the base ring is received within a locking alignment groove in the outer screen portions when the outer screen assembly is assembled onto the central frame. A method of cleaning a catalyst filter basket is also described.

BRIEF DESCRIPTION OF THE DRAWINGS

For a thorough understanding of the present invention, reference is made to the following detailed description of the preferred embodiments, taken in conjunction with the accompanying drawings, wherein like reference numerals designate like or similar elements throughout the several figures of the drawings and wherein.

DETAILED DESCRIPTION OF THE INVENTION

Figure 1:
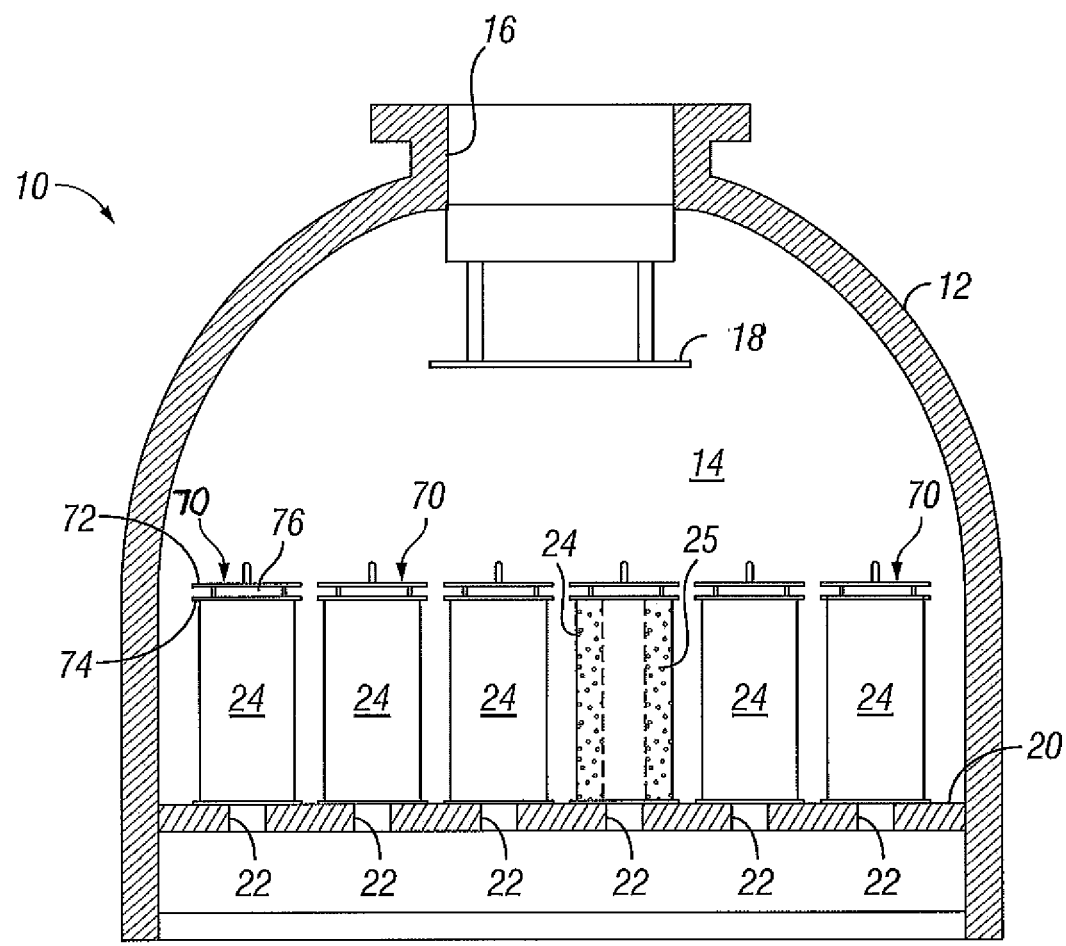
FIG. 1 is a side, cross-sectional view of an exemplary catalytic process reactor which contains a plurality of catalyst filter baskets in accordance with the present invention.

FIG. 1 depicts an exemplary chemical reactor 10 having an outer housing 12 which encloses a chamber 14. In preferred embodiments, the chemical reactor 10 is a catalytic reactor. A feed inlet 16 is located at the top of the housing 12. An impingement plate 18 is suspended below the feed inlet 16. A catalyst support tray 20 is located within the chamber 14 and has a plurality of openings 22 disposed within. Catalyst filter baskets 24 are disposed atop the openings 22 and affixed to the tray 20. Each of the catalyst filter baskets 24 contains a solid catalyst material 25.

FIGS. 2-7 illustrate an exemplary catalyst filter basket 24 in greater detail. The filter basket 24 includes a central frame 26 that includes a base ring 28. A generally cylindrical inner screen portion 30 extends axially from the base ring 28 and defines an open central shaft 32 within. The inner screen portion 30 is formed of mesh or is perforated with openings 34 which will permit fluids to pass through. The base ring 28 has an annular shape and defines a central opening 36. In accordance with a preferred embodiment, the base ring 28 is formed of stacked annular members 38, 40. The lower annular member 40 has a greater outer diameter which provides a lip 42 which can be engaged by locking levers 43 (FIG. 2) to secure the filter basket 24 to the support tray 20.

Figure 2:
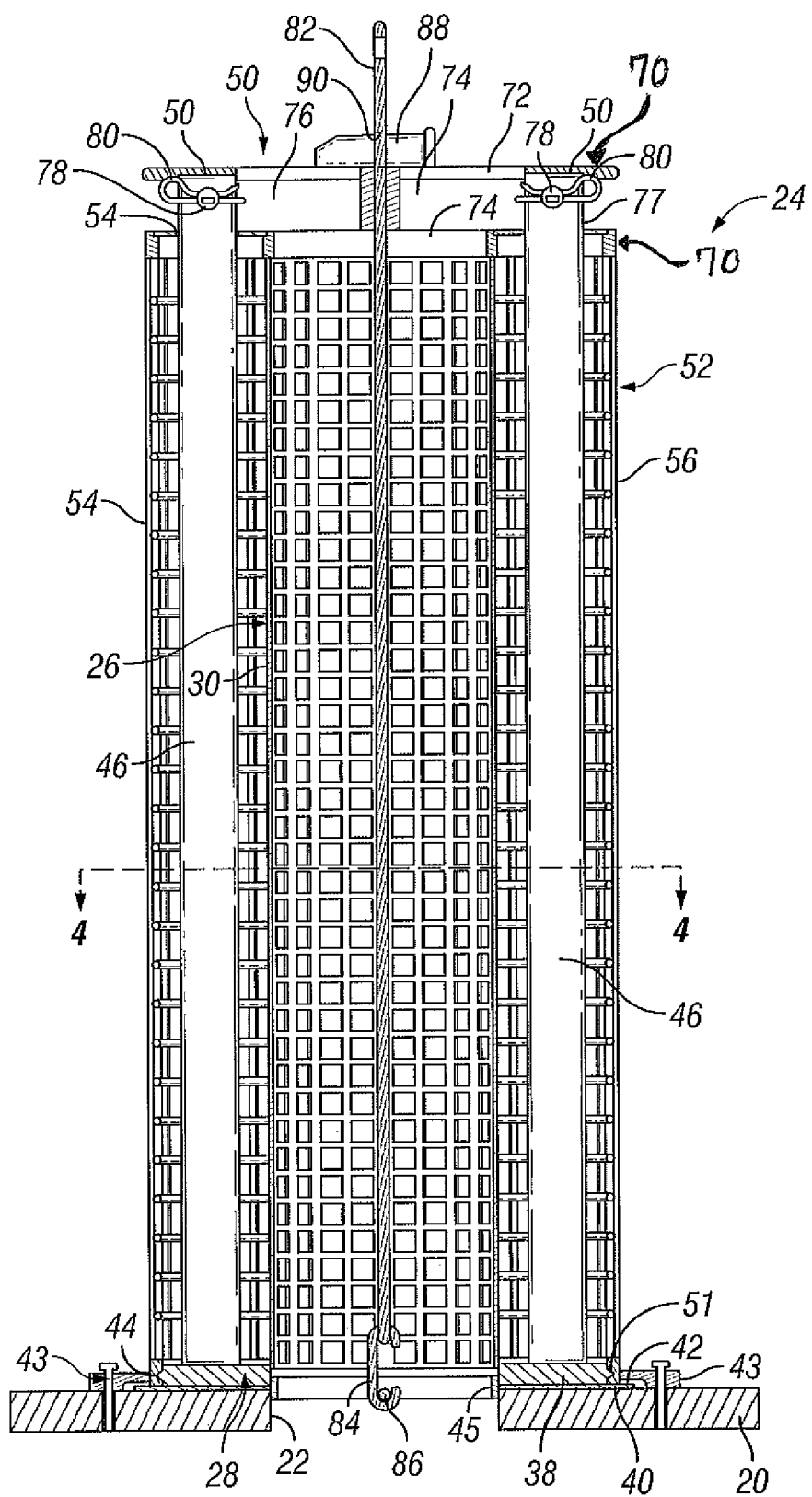
FIG. 2 is a side, cross-sectional view of an exemplary catalyst filter basket constructed in accordance with the present invention.
Figure 3:
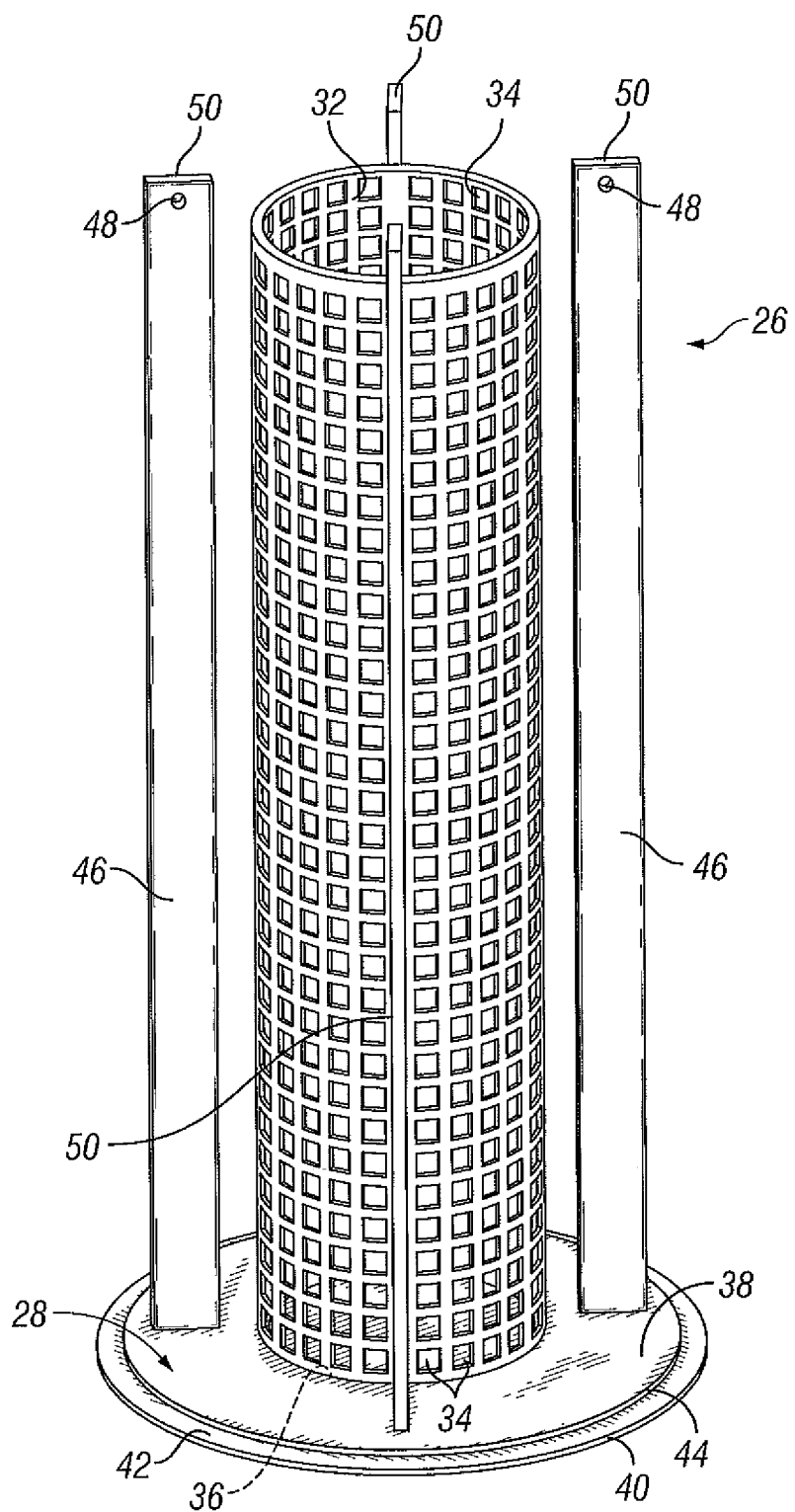
FIG. 3 is an isometric view of an exemplary catalyst filter basket central frame having the outer screen assembly removed.
Figure 5:
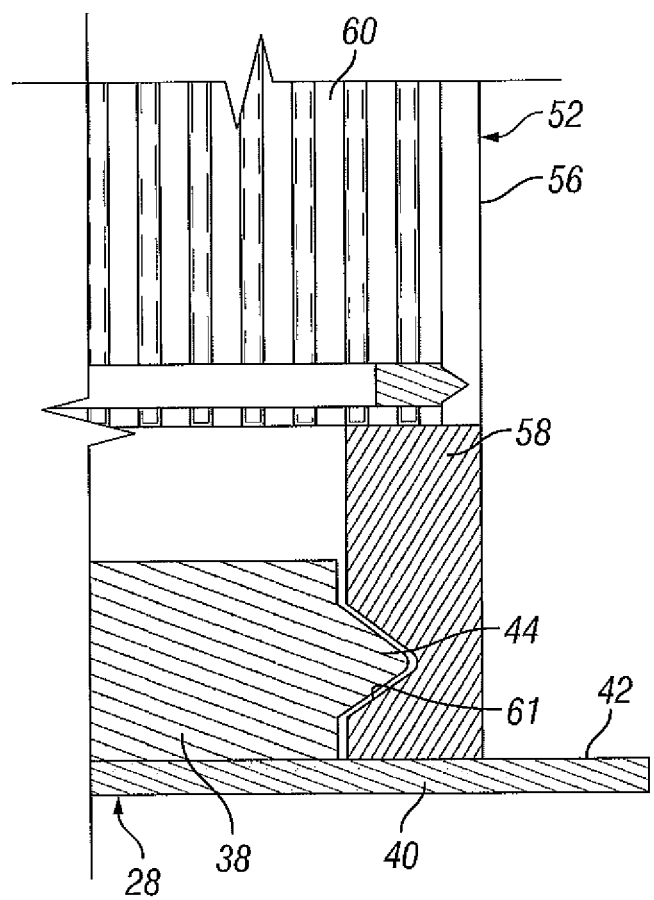
FIG. 5 is a cross-sectional detail view of a portion of the catalyst filter basket which provides an axial locking arrangement between the central frame and the outer screen assembly.
Figure 6:
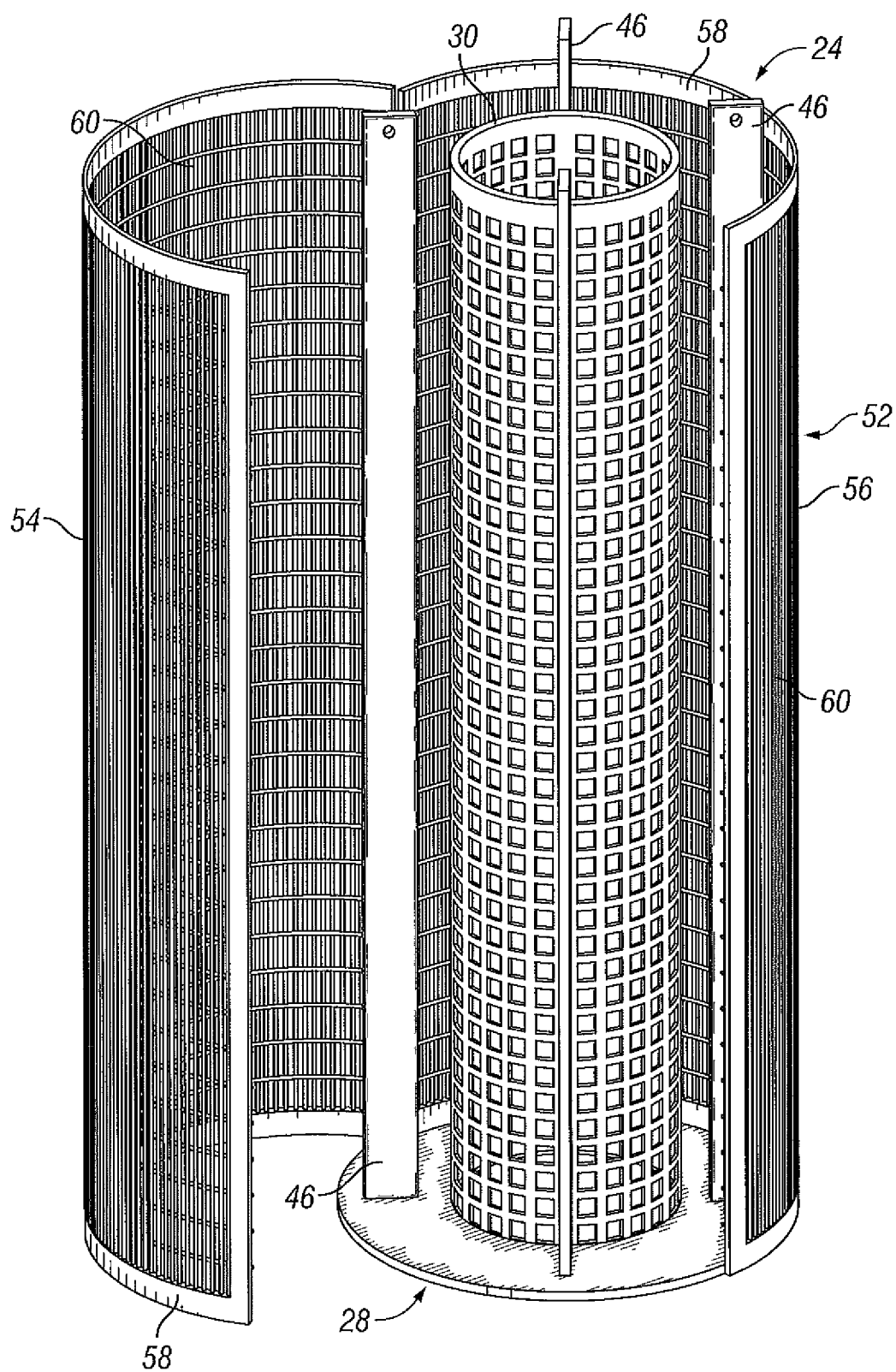
FIG. 6 is an isometric view of the catalyst filter basket of FIGS. 1-5, now with the outer screen assembly partially removed.

As best shown in FIG. 5, an annular ridge 44 projects from the outer circumferential surface of the upper annular member 38 of the base ring 28. In preferred embodiments, the ridge 44 is V-shaped. A centering ring 45 (see FIG. 2) is preferably secured radially within the annular members 38, 40 and preferably projects downwardly below the lower annular member 40 (as seen in FIG. 2). The downwardly projecting portion of the centering ring 45 will extend into an opening 22 in the support tray 20 to help ensure that the catalyst filter basket 24 is properly seated upon the support tray 20.

Support struts 46 extend axially from the base ring 28 and are preferably slightly longer than the inner screen portion 30 of the central frame 26. Openings 48 are disposed through each support strut 46 proximate its upper end 50.

Figure 4:
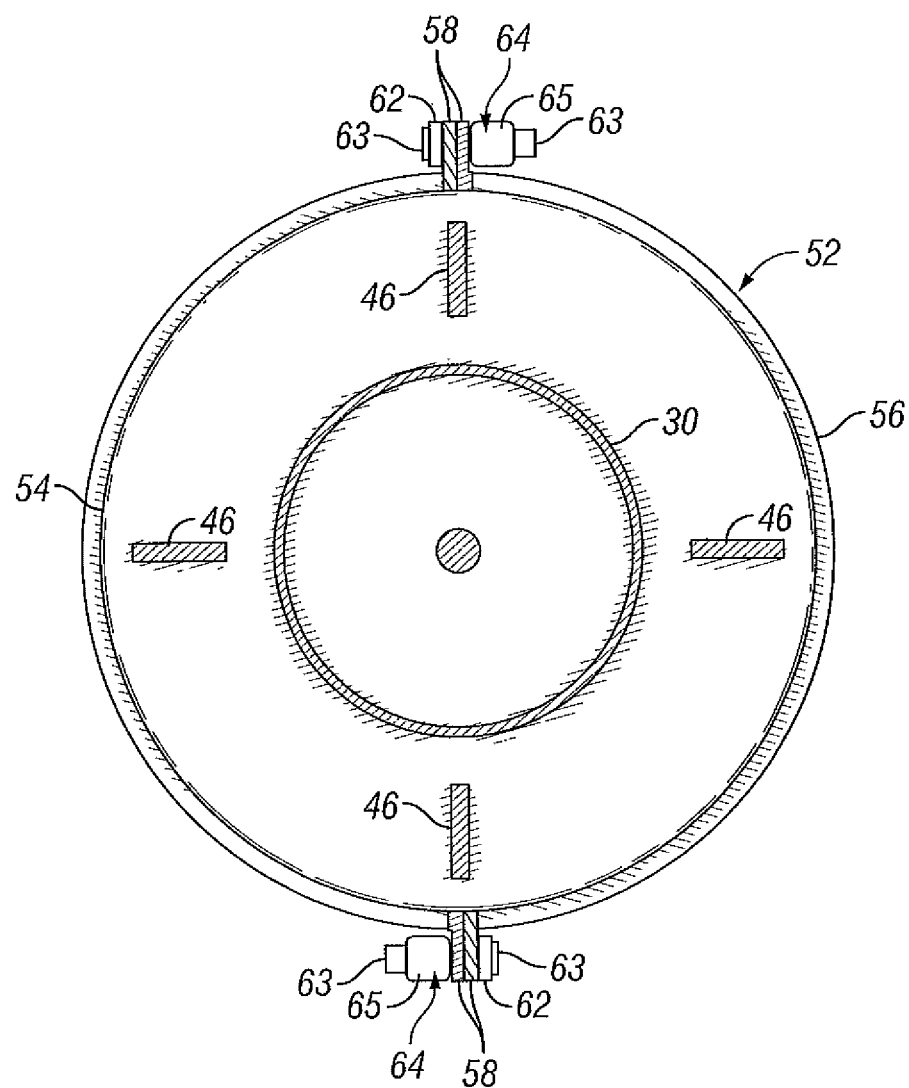
FIG. 4 is an axial cross-sectional view taken along line 4-4 in FIG. 2.

An outer screen assembly 52 radially surrounds the inner screen portion 30. As best shown by FIG. 4, the outer screen assembly 52 is formed of a plurality of separate screen portions 54, 56 which are assembled together to form a complete cylindrical screen assembly. In the depicted embodiment, there are two screen portions 54, 56. However, there may be three or even more screen portions, if desired. In accordance with the present invention, at least one of the screen portions 54, 56 is secured in an easily releasable manner to another of the screen portions 54, 56 and is removable from the filter basket 24 upon release. In accordance with a particularly preferred embodiment, all of the separate screen portions 54, 56 are completely removable from the central frame 26. Preferably, the separate screen portions 54, 56 each have a supporting peripheral frame 58 and a central mesh filtering portion 60, which is porous to permit fluid to pass through the screen portion 54 or 56. The screen portions 54, 56 are curved to provide a semi-circular cross-section, as depicted in FIG. 4. The lower end of the frame 58 of each screen portion 54, 56 includes a locking alignment groove 61 which is shaped and sized to be complementary to the ridge 44 of the base ring 28. As illustrated in FIG. 1, the solid catalyst material 25 is retained in a catalyst storage area which is defined between the inner screen portion 30 and the outer screen assembly 52.

Figure 7:
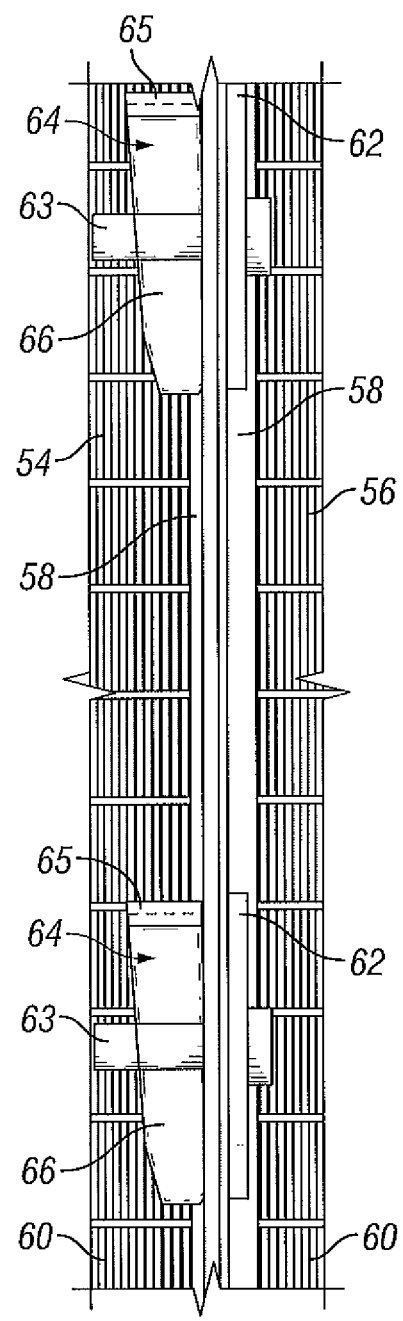
FIG. 7 is an external view of portions of a catalyst filter basket showing split key quick release mechanisms.
Figure 8:
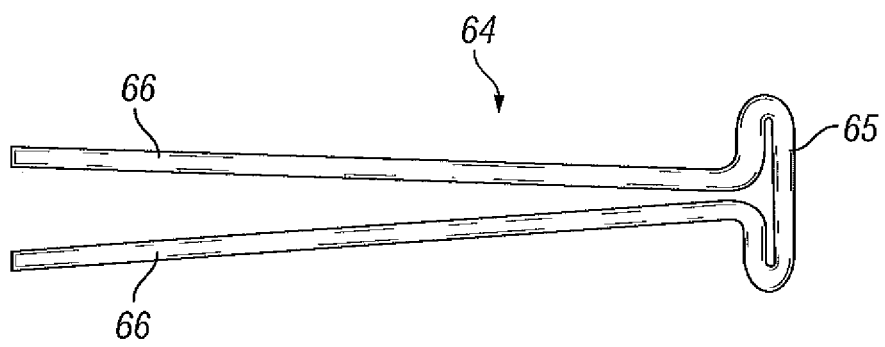
FIG. 8 is a top view of an exemplary split key apart from other components of a catalyst filter basket.
Figure 9:
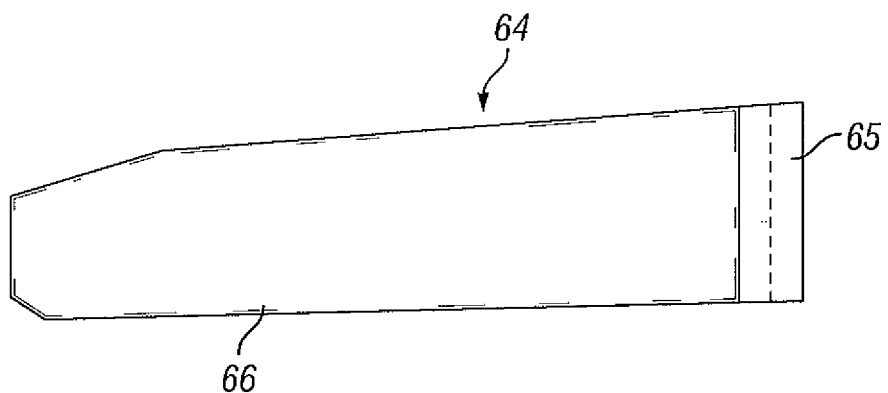
FIG. 9 is a side view of the split key shown in FIG. 8.

In accordance with preferred embodiments, the screen portions 54, 56 of the outer screen assembly 52 are releasably affixed to each other using a quick release mechanism. Releasable attachment of the screen portions 54, 56 can be done using a split key connector. FIGS. 4 and 7 illustrate assembled split key connections which include a slotted plate 62, slotted pin 63 and split key 64. FIGS. 8 and 9 depict an exemplary split key 64 having a head portion 65 and two tang portions 66 which extend away from the head portion 65. To assemble the split key connection, the slotted pin 63 is inserted through slotted plate 62, and frames 58 for each screen portion 54, 56. Thereafter, the tang portions 66 of the split key 64 are passed through slotted pin 63. In order to release the split key connection, the split key 64 is removed from the slotted pin 63. The slotted pin 63 is removed from frames 58, releasing the screen portions 54, 56 from each other.

Figure 10:
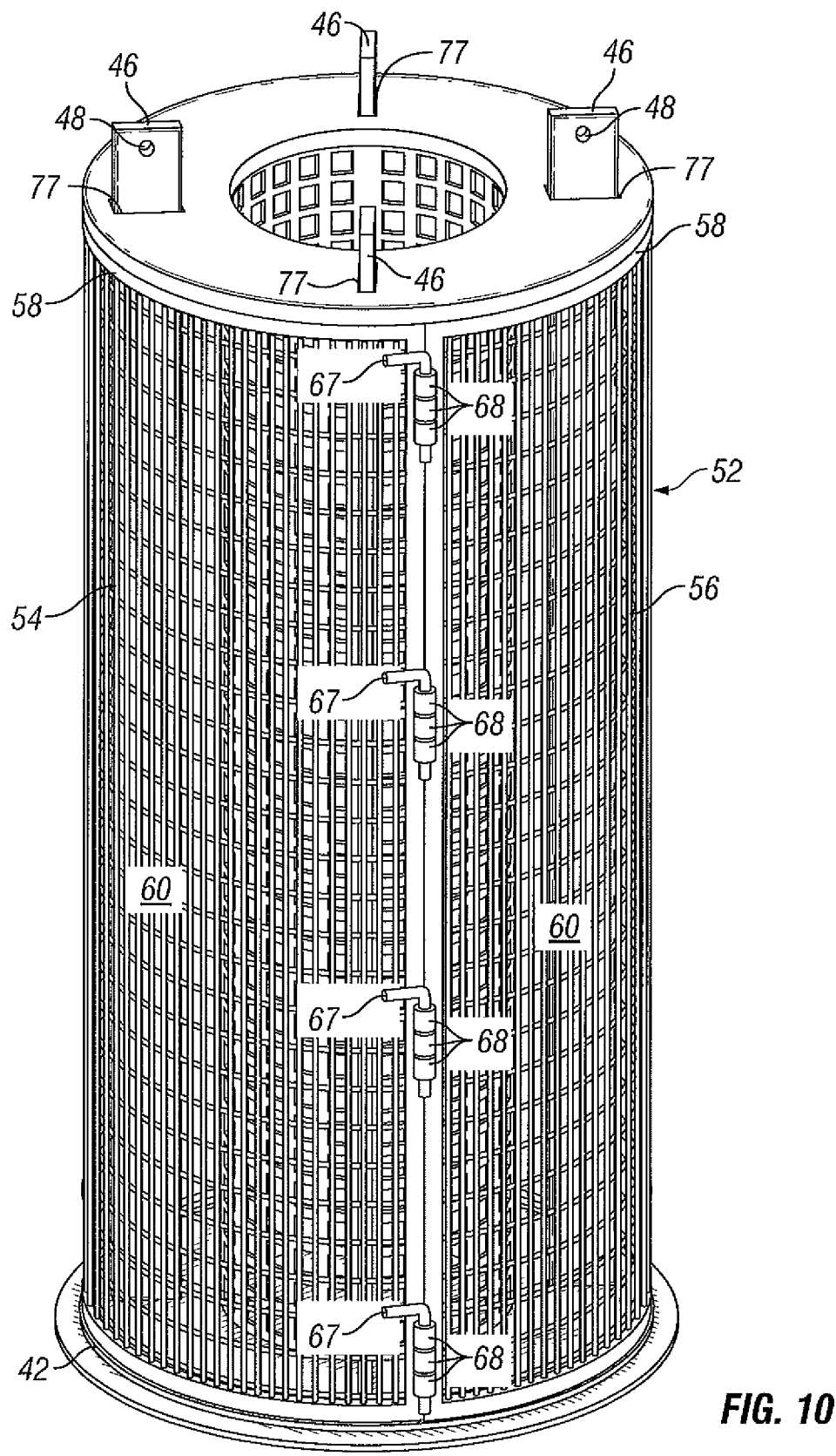
FIG. 10 is an isometric view of an alternative embodiment for a catalyst filter basket in accordance with the present invention.

In an alternative embodiment, draw bolts 67 are used as the quick release mechanism to secure opposing bushings 68 on screen portions 54, 56 together. This arrangement is depicted in FIG. 10. The draw bolt 67 can be slid into the bushings 68 to secure them together, as illustrated in FIG. 10, or slid out of the bushings 68 to allow the bushings 68 to separate and free the screen portions 54, 56 from each other.

In accordance with preferred embodiments, the outer screen assembly 52 is axially locked to the central frame 26 when it is assembled through use of a locking groove arrangement. The locking alignment groove 61 in the frame 58 of each screen portion 54, 56 will receive the ridge 44 of the base ring 28, as best shown by FIG. 5. When this is done, the outer screen assembly 52 will be secured against axial movement with respect to the central frame 26. If desired, the positions of the ridge and locking alignment groove can be reversed such that the ridge 44 is formed on the screen portions 54, 56 and the groove 61 is formed on the base ring 28.

The catalyst filter basket 24 includes a top cover 70 which encloses the catalyst storage area of the filter basket 24 when attached. The top cover 70 includes upper and lower annular discs 72, 74 which are separated from one another by beams 76. The lower disc 74 is perforated by slots 77. The slots 77 are shaped and sized to allow the upper ends 50 of struts 46 to pass through. The lower disc 74 is then secured to the central frame 26 by inserting locking clevis pins 78 through the openings 48 in each strut 46. Each clevis pin 78 is then retained in place by split pin 80 (FIG. 2). The upper disc 72 is secured atop the beams 76. When assembled, a connecting rod 82 extends from the top cover 70 to the base ring 28.

When assembled, solid catalyst material 25 is contained within the catalyst filter basket 24 radially between the inner screen portion 30 and the outer screen assembly 52. The catalyst filter basket 24 is placed onto the catalyst support tray 20 so that the open central shaft 32 of the catalyst filter basket 24 is centered over an opening 22 in the support tray 20. During operation of the catalytic reactor 10, a chemical feed is flowed in through the reactor feed inlet 16. To cross the support tray 20, the chemical feed must pass through the outer screen assembly 52, catalyst material 25 and inner screen portion 30 of the catalyst filter baskets 24 in order to reach the openings 22 of the support tray 20.

As shown in FIG. 2, the catalyst filter basket 24 can be affixed to the support tray 20 by locking levers 43 which engage the lip 42 of the base ring 28. In addition, a hook 84 secures connecting rod 82 to a strut 86 of the support tray 20 to help secure the catalyst filter basket 24 in place. An additional split key 88 can be inserted through a slot 90 in connecting rod 82 to lock the components together.

The inventor has found that the construction of the catalyst filter basket 24 makes it easy to clean and refill the catalyst filter basket 24 with new catalyst material 25 thereby saving significant time and effort. As a result, the present invention also provides a method for cleaning a catalyst filter basket 24. In accordance with the method of cleaning, a catalyst filter basket 24 is first removed from the support tray 20. Preferably, the top cover 70 is removed from the central frame 26. To do this, the split key 88 is removed from the slot 90 of connecting rod 82. Upper disc 72 is removed. Split pins 80 are taken out of the clevis pins 78 and the clevis pins 78 withdrawn from the struts 46. The beams 76 and lower disc 74 can now be removed from the central frame 26. The outer screen assembly 52 is then released and removed from the central frame 26 by releasing the quick release mechanism which is securing the screen portions 54, 56 together. Spent catalyst material 25 can then be swept or washed away from the central frame 26 and other components. To reassemble the catalyst filter basket 24, the screen portions 54, 56 are replaced onto the central frame 26 so that the ridge 44 of the base ring 28 is seated within the groove 61 of each screen portion 54, 56. The quick release mechanisms are then reaffixed to secure the screen portions 54, 56 together. New catalyst material 25 can then be placed into the open upper end of the filter basket 24 and the top cover 72 then secured onto the catalyst filter basket 24.

Those of skill in the art will recognize that numerous modifications and changes may be made to the exemplary designs and embodiments described herein and that the invention is limited only by the claims that follow and any equivalents thereof.

The invention claimed is:

1. A catalyst filter basket for containing catalyst material within a catalytic chemical reactor, the catalyst filter basket comprising:

a central frame having a base ring formed of an upper annular member and a lower annular member, wherein the upper annular member and the lower annular member are stacked and wherein the upper annular member comprises an annular v-shaped ridge, and a generally cylindrical inner screen portion which extends upwardly from the base ring;

a generally cylindrical outer screen assembly radially surrounding the inner screen portion of the central frame, the outer screen assembly being formed of separate screen portions which are assembled to form a complete generally cylindrical outer screen assembly, wherein each screen portion comprises a frame that includes a locking alignment groove which is shaped and sized to complement the annular v-shaped ridge of the upper annular member;

wherein at least one separate screen portion is secured by a quick release mechanism to another separate screen portion to form the complete generally cylindrical outer screen assembly;

wherein the quick release mechanism comprises a split key connector comprised of a slotted plate, a slotted pin, and a split key, wherein the split key is further comprised of a head portion and two tang portions;

wherein the complete generally cylindrical outer screen assembly is axially locked to the central frame when the locking alignment groove in the frame of each screen portion is received by the annular v-shaped ridge of the upper annular member; and wherein the complete generally cylindrical outer screen assembly is removable from the central frame.

2. The catalyst filter basket of claim 1 wherein the complete generally cylindrical outer screen assembly is axially secured to the central frame when assembled by the locking alignment groove wherein the annular v-shaped ridge is received within the locking alignment groove as the complete generally cylindrical outer screen assembly is secured around the central frame.

3. The catalyst filter basket of claim 1 wherein
the slotted pin passes through a portion of two of the separate screen portions; and
the split key passes through a slot in the slotted pin to secure the separate screen portions together.

4. The catalyst filter basket of claim 1 wherein there are two separate screen portions.

5. The catalyst filter basket of claim 1 wherein the separate screen portions each comprise:
a peripheral frame; and
a central mesh filtering portion within the frame which is porous to permit fluid to pass through the screen portion.

6. The catalyst filter basket of claim 1 further comprising a top cover that is releasably secured to the central frame to secure catalyst within a storage area that is defined radially between the generally cylindrical inner screen portion and the complete generally cylindrical outer screen assembly.

7. A catalyst filter basket for containing catalyst material within a catalytic chemical reactor, the catalyst filter basket comprising:
a central frame having a base ring formed of an upper annular member and a lower annular member, wherein the upper annular member and the lower annular member are stacked, and wherein the upper annular member comprises an annular v-shaped ridge, and a generally cylindrical inner screen portion which extends upwardly from the base ring;

a generally cylindrical outer screen assembly radially surrounding the generally cylindrical inner screen portion of the central frame to define a catalyst storage area radially between the generally cylindrical inner screen portion and the generally cylindrical outer screen assembly, wherein the outer screen assembly is formed of a plurality of separate screen portions, wherein each screen portion comprises a frame that includes a locking alignment groove which is shaped and sized to complement the annular v-shaped ridge of the upper annular member, and wherein the generally cylindrical outer screen assembly is axially locked to the central frame when the locking alignment groove in the frame of each screen portion is received by the annular v-shaped ridge of the upper annular member; and wherein the plurality of screen portions are releasably affixed to each other using a quick release mechanism comprising a split key connector and removable from the central frame upon release of the split key connector;

wherein the split key connector is comprised of a slotted plate, a slotted pin, and a split key, and wherein the split key is further comprised of a head portion and two tang portions.

8. The catalyst filter basket of claim 7 wherein the plurality of separate screen portions are assembled to form a complete generally cylindrical outer screen assembly; wherein at least one separate screen portion is secured by the split key connector to another separate screen portion; and wherein the separate screen portions are removable from the central frame upon release of the split key connector.

9. The catalyst filter basket of claim 8 wherein the slotted pin passes through a portion of two of the separate screen portions and the split key passes through a slot in the slotted pin to secure the separate screen portions together.

10. The catalyst filter basket of claim 7 wherein the generally cylindrical outer screen assembly is axially secured to the central frame when assembled by the locking alignment groove wherein the annular v-shaped ridge is received within the locking alignment groove as the generally cylindrical outer screen assembly is secured around the central frame.

11. The catalyst filter basket of claim 8 wherein there are two separate screen portions.

12. The catalyst filter basket of claim 7 further comprising a top cover that is releasably secured to the central frame to secure catalyst within the catalyst storage area.

* * * * *